(12) United States Patent
Zhou et al.

(10) Patent No.: US 10,647,603 B2
(45) Date of Patent: May 12, 2020

(54) METHOD FOR TREATING WASTE WATER AND RECOVERING RESOURCES IN ACRYLIC FIBER PRODUCTION

(71) Applicant: Chinese Research Academy of Environmental Sciences, Beijing (CN)

(72) Inventors: Yuexi Zhou, Beijing (CN); Jinyuan Jiang, Beijing (CN); Yudong Song, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 0 days.

(21) Appl. No.: 16/092,033

(22) PCT Filed: Apr. 14, 2017

(86) PCT No.: PCT/CN2017/080564
§ 371 (c)(1),
(2) Date: Oct. 8, 2018

(87) PCT Pub. No.: WO2017/177963
PCT Pub. Date: Oct. 19, 2017

(65) Prior Publication Data
US 2019/0127254 A1    May 2, 2019

(30) Foreign Application Priority Data
Apr. 15, 2016 (CN) .......................... 2016 1 0237475

(51) Int. Cl.
*C02F 9/00* (2006.01)
*C08J 11/06* (2006.01)
(Continued)

(52) U.S. Cl.
CPC ................. *C02F 9/00* (2013.01); *C08J 11/06* (2013.01); *C02F 1/004* (2013.01); *C02F 1/24* (2013.01);
(Continued)

(58) Field of Classification Search
CPC ..... C02F 9/00; C02F 1/004; C02F 1/44; C02F 1/24; C02F 1/5245; C02F 1/56;
(Continued)

(56) References Cited

FOREIGN PATENT DOCUMENTS

| CN | 1188743 A | 7/1998 |
|---|---|---|
| CN | 101423312 A | 5/2009 |

(Continued)

OTHER PUBLICATIONS

Machine-generated English translation of CN 1188743, dated Jun. 13, 2019.*

(Continued)

*Primary Examiner* — Fred Prince
(74) *Attorney, Agent, or Firm* — Amster, Rothstein & Ebenstein LLP

(57) ABSTRACT

Provided is a method of treating wastewater and recovering resources in acrylic fiber production, comprising the following steps: 1) filtering wastewater from water-washing and filtering unit of acrylic fiber plants by a filter to intercept and recover high-molecular-weight polymer contained therein, and then making the recovered polymer returned back to the acrylic fiber production and entered the finished product, optionally, reusing part of filtered wastewater as low salinity water in the water-washing and filtering unit: 2) removing non-interceptable high-molecular-weight polymer in the wastewater by subjecting the wastewater to coagulation and air floatation treatment; 3) introducing the effluent into biological treatment unit and adding polyvalent metal ions as an adsorption promoter to increase the removal of the non-biodegradable organics in the biological treatment unit; and 4) removing the organics remained in the effluent from the biological treatment unit by an advanced treatment.

10 Claims, 2 Drawing Sheets

(51) Int. Cl.
*C02F 1/00* (2006.01)
*C02F 1/44* (2006.01)
*C02F 1/24* (2006.01)
*C02F 1/52* (2006.01)
*C02F 1/56* (2006.01)
*C02F 1/66* (2006.01)
*C02F 3/30* (2006.01)
*C02F 1/72* (2006.01)
*C02F 1/76* (2006.01)
*C02F 103/38* (2006.01)

(52) U.S. Cl.
CPC .............. *C02F 1/44* (2013.01); *C02F 1/5245* (2013.01); *C02F 1/56* (2013.01); *C02F 1/66* (2013.01); *C02F 1/722* (2013.01); *C02F 1/76* (2013.01); *C02F 3/301* (2013.01); *C02F 2001/007* (2013.01); *C02F 2103/38* (2013.01); *C02F 2301/08* (2013.01); *C02F 2303/16* (2013.01); *C08J 2333/04* (2013.01)

(58) Field of Classification Search
CPC .. C02F 1/66; C02F 3/301; C02F 1/722; C02F 1/76; C02F 2001/007; C02F 2103/38; C02F 2301/08; C02F 2303/16; C08J 11/06; C08J 2333/04

USPC ................ 210/631, 703, 705, 723, 729, 734
See application file for complete search history.

(56) References Cited

FOREIGN PATENT DOCUMENTS

| | | |
|---|---|---|
| CN | 101525202 A | 9/2009 |
| CN | 102145965 A | 8/2011 |
| CN | 102276107 A | 12/2011 |
| CN | 104971544 A | 10/2015 |
| CN | 105712585 A | 6/2016 |
| EP | 2 657 198 B1 | 1/2016 |
| JP | 2008110280 A | 5/2008 |

OTHER PUBLICATIONS

Machine-generated English translation of CN 101423312, dated Jun. 13, 2019.*
Office Action dated Aug. 8, 2019 in connection with German Patent Application No. 11 2017 002 003.4.
Notification of Reexamination dated Dec. 30, 2019 in connection with Chinese Patent Application No. 201610237475.1.
Mao Y, entitled "The new technology of biological water treatment," China Railway Publishing House on Apr. 10, 2015.

* cited by examiner

METHOD FOR TREATING WASTE WATER AND RECOVERING RESOURCES IN ACRYLIC FIBER PRODUCTION

TECHNICAL FIELD

The present application relates to a method for recovering recourses, reducing and advanced-removing pollutants of wastewater in the acrylic fiber production, more particularly, relates to a method for treating wastewater and recovering resources in acrylic fiber production

BACKGROUND

Acrylic fiber is an important synthetic fiber material and is the basic raw material for the textile industry. China is a large producer of acrylic fiber in the world and has many large-scale enterprises for producing acrylic fiber. Wastewater produced from acrylic fiber production is a typical non-biodegradable and toxic organic industrial wastewater, which contains varieties of toxic organic compounds such as acrylonitrile, DMAC and DMF. It also contains high concentrations of non-biodegradable organics. The traditional treatment process is difficult to meet standards, so it has always been a challenge for treating thus produced wastewater in the industrial wastewater treatment field. China's Integrated Wastewater Discharge Standard (GB8978-1996) has modified the COD standard value for special petrochemical plants including acrylonitrile-acrylic fiber plants. In China's newly issued "Petrochemical Industry Pollutant Discharge Standard" (GB 31571-2015), the COD emission limits for special petrochemical plants including acrylonitrile-acrylic fiber plants are 40 mg/L higher than that of other chemical production facilities.

In addition to the non-biodegradable organic additives added during the production process, the non-biodegradable organics in the wastewater yielded in the production of acrylic fiber include high-molecular-weight polymers (above 10 kDa) and low-molecular-weight polymers (below 10 kDa) which are produced during the polymerization and enter the wastewater. High-molecular-weight polymers are products that are lost to the wastewater in the production of acrylic fibers and have a recovery value. Low-molecular-weight polymers are difficult to remove using conventional techniques. The current technologies mostly focus on the treatment of the final discharge for enhancing the removal of non-biodegradable pollutants, while there is lack of a technology aiming to reduce the pollutants by means of optimizing the process for producing acrylic fibers and reducing the pollutants in the wastewater discharged in each procedure of the process.

SUMMARY OF THE INVENTION

The technical problem solved by the present application is to provide a method for reducing the pollutants step by step in the production process of acrylic fibers by recovering the resources from wastewater, reducing the concentration of the pollutants and comprehensively utilizing the pollutant removal capability of each wastewater treatment unit. A traditional acrylic fiber production process is shown in FIG. 1. The method of the present application is an improvement over the traditional acrylic fiber production process, which reduces the discharge of pollutants in the wastewater while recovering available resources in the wastewater.

According to one aspect, the present application provides a method for treating wastewater and recovering resources in acrylic fiber production, comprising the following steps:

A) filtering by a filter to intercept and recover high-molecular-weight (molecular weight is above 10 kDa) polymer contained in the wastewater from water-washing and filtering unit of the acrylic fiber plant; wherein the recovered polymer is returned back to the acrylic fiber production process, and optionally, part of filtered wastewater is reused in the water-washing and filtering unit as low salinity water;

B) removing non-interceptable high-molecular-weight polymer in the wastewater by subjecting the wastewater from step A) to coagulation and air floatation treatment;

C) introducing the effluent from step B) into biological treatment unit and adding polyvalent metal ions as an adsorption promoter to increase the removal efficiency of the non-biodegradable organics in the biological treatment unit; and D) removing the remained non-biodegradable organics (such as low molecular weight polymer) in the effluent from the biological treatment unit of step C) by an advanced treatment, wherein the advanced treatment refers to a treatment step combining any of oxidation, coagulation, precipitation and air flotation.

According to some embodiments of the present application, in step A), the wastewater from the acrylic fiber water-washing and filtering unit containing the high-molecular-weight polymer is precipitated, filtered, intercepted and recovered, wherein the filter used is a surface filter using a membrane material as main component or a depth filter using a fiber tow or fiber cotton as a filter medium. The wastewater after filtration is treated subsequently and the high-molecular-weight polymer which is intercepted is dispersed into backwash water by periodic backwashing. Before filtration, the wastewater is subjected to precipitation treatment firstly. The hydraulic retention time of the precipitator is 2 to 5 hours. The filtration rate through the fiber tow or fiber cotton in the filter is 10 to 30 m$^3$/(m$^2$·h) and the height of the filter layer is 1 to 2 m. The backwash period is 1 to 3 days. The precipitator and the filter are made of acid resistant and corrosion resistant materials. The recovery rate of the high-molecular-weight polymer is 40% to 70%.

According to some embodiments of the present application, the backwashing of the filter may be performed by a combination of gas washing and water-washing to increase the concentration of the high-molecular-weight polymer in the backwash water.

According to some embodiments of the present application, the backwash water dispersed with the high-molecular-weight polymer is returned back to the precipitator for precipitation treatment, and the polymer slurry concentrated at the bottom of the precipitator is periodically returned back to the acrylic fiber production process and finally enters the acrylic fiber product, achieving the recovery of resources of the polymer.

According to some embodiments of the present application, the coagulation and air flotation treatments aim to further remove the high-molecular-weight polymers that are not intercepted in the wastewater, the pH of the wastewater is adjusted to 6 to 9 before coagulation treatment, and the to coagulants and coagulant aids are added successively to the wastewater during the coagulation process, which is then introduced into the air flotation unit after reaction. The coagulant is poly aluminum chloride or poly aluminum ferrous chloride and the amount is 50 to 200 mg/L; the coagulant aid is polyacrylamide and the amount is 2 to 10 mg/L, the reflux ratio of the air-saturated water is 30% to 60% and the rate for removing COD is 10% to 20%.

According to some embodiments of the present application, the air flotation unit for air flotation treatment may be a horizontal flow air flotation tank or a high efficient shallow air flotation tank. The polymer was intercepted to form dross and the effluent was subsequently treated.

According to some embodiments of the present application, the effluent from the coagulation and air flotation treatment is introduced into biological treatment unit for treatment and polyvalent metal ions as an adsorption promoter is added to increase the removal efficiency of the non-biodegradable polymer in the biological treatment unit, wherein the polyvalent metal ions include, but not limits to, calcium ions, magnesium ions, aluminum ions, and a mixture thereof (i.e. the polyvalent metal ions as the adsorption promoter is added in the form of dissolved salts), and the amount thereof is 5 to 100 mg/L (for example, the amount of calcium ions added is 30 mg/L or the amount of aluminum ions added is 100 mg/L). The effluent from the coagulation and air flotation treatment is added with the polyvalent metal ions as the adsorption promoter, and then well mixed with return sludge. Or, the polyvalent metal ions may be added directly at the position for mixing the return sludge and the influent, or added when the mixed liquid of sludge and water of the aeration tank entering secondary precipitator; wherein the biological treatment unit uses an activated sludge process or an activated sludge process with added biological carriers, and the age of the activated sludge is 15 to 30 days. In the biological treatment tank for continuously treating, nitrogen and biodegradable organics are biologically removed by setting macroscopic anoxic zones and aerobic zones, or by adding biological carriers to form anoxic zones within the carriers. In the biological treatment tank for batch treating, nitrogen and biodegradable organics are biologically removed by setting anoxic and aerobic periods. After biological treatment, the amount of the ammonia nitrogen in the effluent may be dropped below 10 mg/L. The concentration of suspended solids in the mixed liquid may be 3000-6000 mg/L and the sludge recycle ratio may be 100% to 200%. Compared with the treatment without the addition of adsorption promoters, the COD of the effluent from the biological treatment unit was reduced by 30-120 mg/L.

According to some embodiments of the present application, the advanced treatment can remove the non-biodegradable organics such as low molecular weight polymers in the effluent from the biological treatment unit, which achieves the removal of the non-biodegradable organics by adding an oxidizing agent, a coagulant or a compound agent for oxidation and coagulation, and/or a coagulant aid to the effluent from the biological treatment unit successively to get the combined effects of oxidation, coagulation, precipitation and air flotation.

According to some embodiments of the present application, the oxidizing agent is a water-soluble oxidizing agent such as hydrogen peroxide and chloric acid, and the amount added is 50 to 400 mg/L; the coagulant includes but not limits to polyvalent metal salts and polyvalent polymers and the amount added is 200 to 2000 mg/L; the coagulant aid includes but not limits to diatomaceous earth and polyacrylamide, and the added amount is 2 to 15 mg/L; the pH for reaction is 6 to 8; and the COD of the effluent is reduced to below 150 mg/L.

According to some embodiments of the present application, the oxidation and coagulation treatment can be performed in a reaction vessel with mechanical or hydraulic stirring, or in a static mixer.

The method for treating wastewater and recovering resources in acrylic fiber production according to the present application has at least one of the following advantages:

1) By increasing units for recovering resources, it achieves the recovery of resources and decreases the difficulty in and the cost for treating the wastewater. Acrylic fiber polymers are the main non-biodegradable organics in the wastewater from the production of acrylic fibers, wherein the high-molecular-weight polymers are products that are lost to the wastewater in the production of acrylic fibers and have a recovery value. Therefore, through the method of the present application, the high-molecular-weight polymer is recovered by filtration and interception, which on the one hand, achieves resource recovery and increases the product yield; on the other hand, decreases the amount of the non-degradable organics in the wastewater and reduces the difficulty and cost for treating the wastewater.

2) The method of the present application can also reduce the cost for treating the wastewater by controlling and treating the pollutants from each unit in the wastewater treatment process. After intercepting and recovering of the high-molecular-weight polymers, the wastewater from the water-washing and filtering unit of the acrylic fiber production unit still contains polymers with different molecular weights. The method according to the present application can achieve stepwise removal of different types of polymers, thereby ensuring the effect of wastewater treatment and reducing the cost for treating the wastewater. The high-molecular-weight polymers in the wastewater, which are not intercepted, are removed in the coagulation and air flotation unit by adding polyvalent metal ions as an adsorption promoter wherein the removal of non-biodegradable polymers in the biological treatment unit is enhanced. The non-biodegradable organics such as the remained low molecular weight polymers in the effluent from the biological treatment can be removed by advanced treatment. Compared with the traditional method by which the non-biodegradable organics are primarily removed in the advanced treatment units, the method according to the present application can provide more stable quality of effluent with lowered cost for the treatment.

3) Due to being based on the existing traditional process for producing acrylic fiber, the method according to the present application is suitable for the modification on the existing production plants. With a small investment, significant resource recovery and pollutant reduction effects can be achieved.

The method of the present application will be further described below with reference to the accompanying drawings.

DETAILED DESCRIPTION

Example 1

Figure 1:
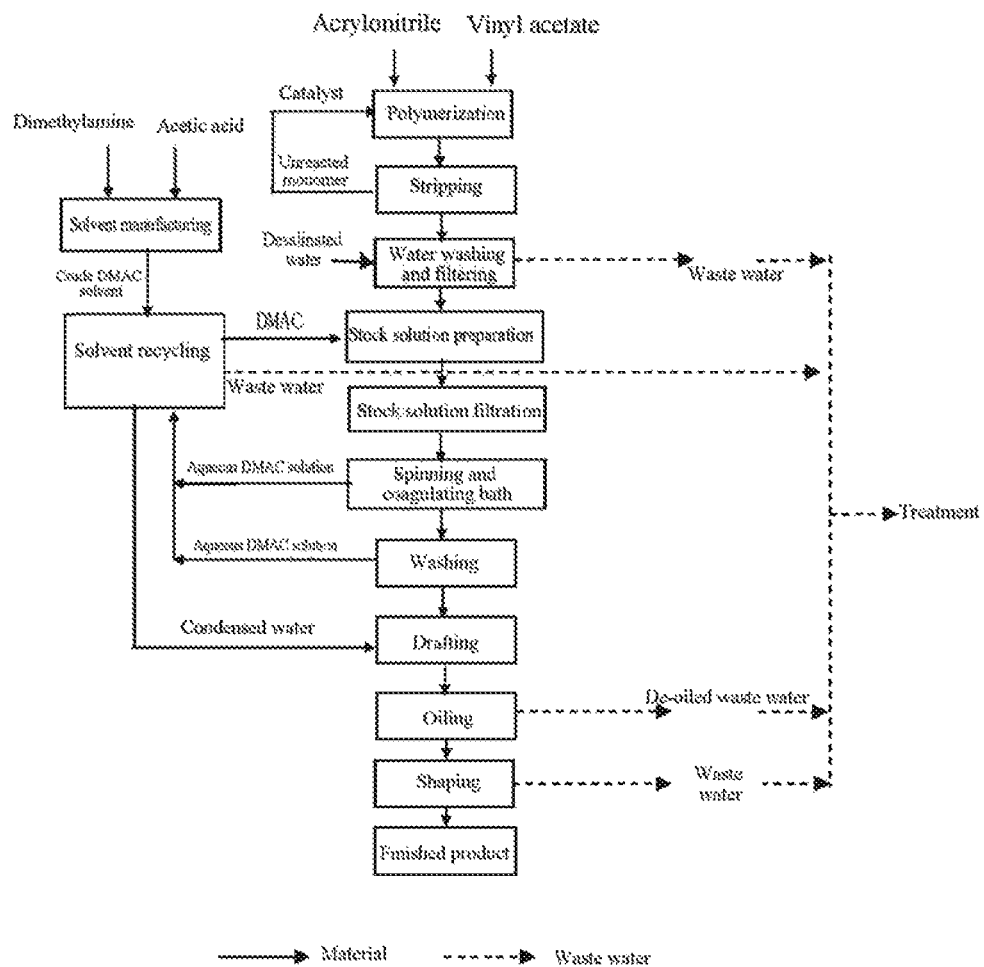
FIG. 1 shows the traditional process for producing acrylic fiber.
Figure 2:
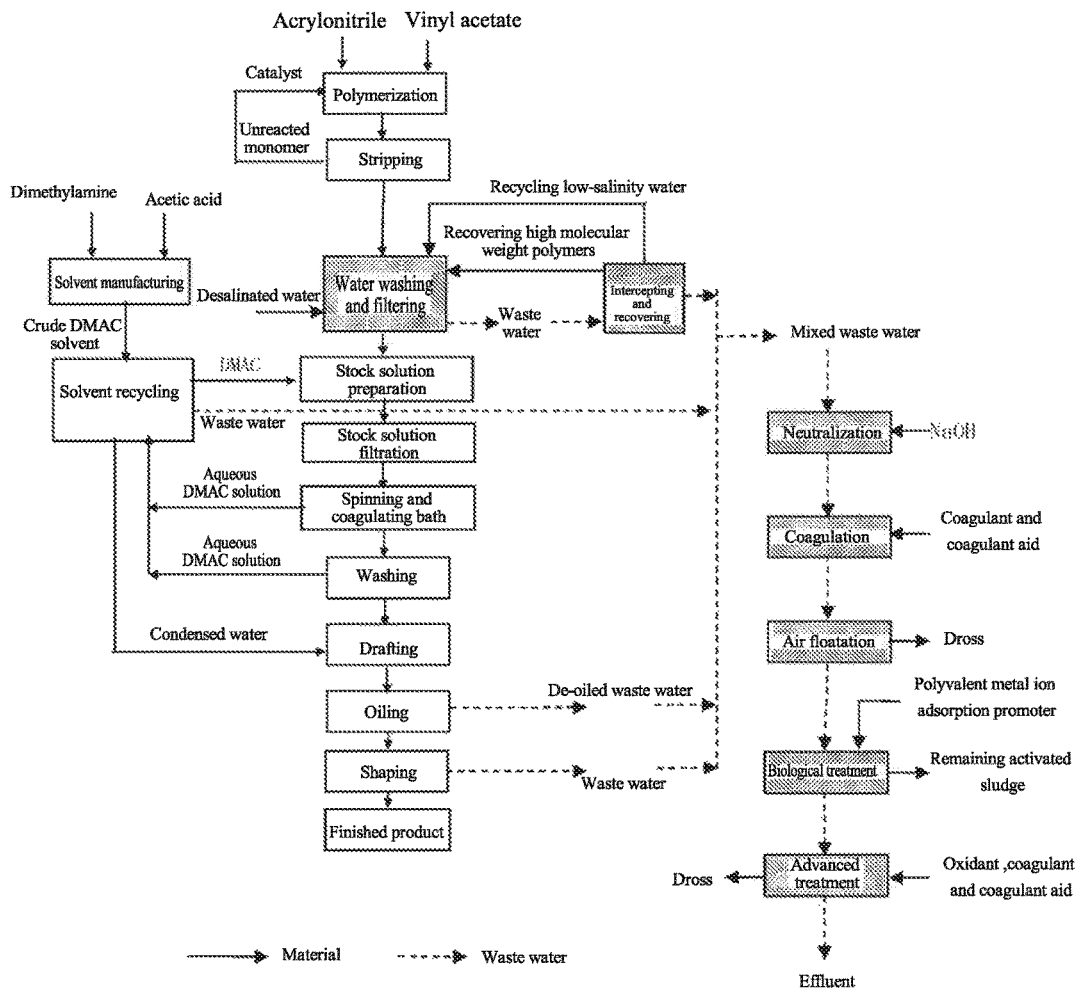
FIG. 2 shows an improved method according to the present application for producing acrylic fiber and treating the wastewater.

FIG. 1 shows the traditional acrylic fiber production plants and the process thereof, by which the COD for the total drainage of the plant is up to 710 mg/L.

Using the method of the present invention, the traditional plants and the process thereof were modified as follows:

(1) By adding a ceramic membrane filter having the pore size of 0.5 μm in the water-washing and filtering unit, the high-molecular-weight polymer was intercepted and recovered. 100 g polymer was intercepted and recovered per ton wastewater, and the COD of the wastewater was decreased by 230 mg/L. The high-molecular-weight polymer intercepted was returned back to the water-washing and filtering unit after back-washing, precipitating and concentrating, and then entered into the product finally. Part of the filtrate was used as low salinity water for water-washing and filtering the polymer.

(2) The effluent from the water-washing and filtering unit was subjected to coagulation and air flotation treatment, wherein the coagulant used was poly aluminum chloride (PAC) and the amount was 50 mg/L; the coagulant aid was polyacrylamide (PAM) and the amount was 2 mg/L. The COD was decreased by 100 mg/L.

(3) Calcium chloride was added to the effluent from the coagulation and air flotation treatment as an adsorption promoter and the amount of the calcium ion added was 10 mg/L. Then, it was treated by the anoxic-aerobic activated sludge method, wherein inoculation was performed by using the sludge including but not limited to the activated sludge from municipal sewage. The sludge age was controlled at 15 days. Compared with the COD of the wastewater without adding adsorption promoter (301 mg/L), the COD of the effluent from biological treatment (effluent from secondary precipitation tank) was reduced by 76 mg/L, and the COD of the effluent was 225 mg/L and the ammonia nitrogen was 5 mg/L. If calcium chloride was not added to the effluent from the coagulation and air flotation treatment but only added to the effluent from the secondary precipitation tank at a calcium ion concentration of 10 mg/L for coagulation and precipitation treatment, the COD of the effluent was only decreased from 301 mg/L to 294 mg/L, the pollutant removal effect was not significant.

4) The effluent from the above biological treatment was subjected to advanced treatment with $H_2O_2$ as an oxidizing agent, and the amount was 100 mg/L. Ferrous sulfate was used as a catalyst and a coagulant, and the amount was 500 mg/L. PAM was used as a coagulant aid and the amount was 3 mg/L. The reaction was carried out in a static mixer, and the separation was performed by high-efficiency shallow air flotation. The COD was 125 mg/L.

Example 2

FIG. 1 shows the traditional acrylic fiber production plants and the process thereof, by which the COD for the total drainage of the plant was up to 753 mg/L.

Using the method of the present invention, the traditional plants and the process thereof were modified as follows:

(1) By adding a fabric filter having the pore size of 1 μm to the water-washing and filtering unit, the high-molecular-weight polymer was intercepted and recovered. 80 g polymer was intercepted and recovered per ton wastewater, and the COD of the wastewater was decreased by 200 mg/L. The high-molecular-weight polymer intercepted was returned back to the water-washing and filtering unit after back-washing and precipitating, and enters into the product finally. Part of the filtrate was used as low salinity water for water-washing and filtering the polymer.

(2) The effluent from the water-washing and filtering unit was subjected to coagulation and air flotation treatment, wherein the coagulant was poly aluminum ferrous chloride and the amount was 75 mg/L; the coagulant aid was polyacrylamide and the amount was 4 mg/L. The COD was decreased by 60 mg/L.

(3) The effluent from the coagulation and air flotation treatment was treated by anoxic-aerobic activated sludge method and the sludge age was controlled at 20 days. Magnesium chloride as an adsorption promoter was added at the position for mixing the return sludge and the influent, and the amount of the magnesium ion added was 75 mg/L. Compared with the COD of the wastewater without adding adsorption promoter (280 mg/L), the COD of the effluent from the biological treatment (effluent from secondary precipitation tank) was reduced by 50 mg/L, and the COD of the effluent was 230 mg/L and the ammonia nitrogen was 7 mg/L. If magnesium chloride was not added at the position for mixing the return sludge and the influent but only added to the effluent from the secondary precipitation tank at a magnesium ion concentration of 75 mg/L for coagulation and precipitation treatment, the COD of the effluent was only decreased from 280 mg/L to 269 mg/L, the pollutant removal effect was not significant.

4) The effluent from the above biological treatment was subjected to advanced treatment with ferrous chloride and chloric acid as oxidizing and coagulation agents, and the amount was 1700 mg/L. PAM was used as a coagulant aid and the amount was 10 mg/L. The reaction was carried out in a mechanic stirring reaction vessel. The separation was carried out with horizontal flow air-flotation. The COD was 135 mg/L.

Example 3

FIG. 1 shows the traditional acrylic fiber production plants and the process thereof, by which the COD for the total drainage of the plant was up to 850 mg/L.

Using the method of the present invention, the traditional plants and the process thereof were modified as follows:

(1) By adding an acrylic fiber tow filter in the water-washing and filtering unit, the high-molecular-weight polymer was intercepted and recycled. 120 g polymer was intercepted and recovered per ton wastewater, accordingly, the COD of the wastewater was decreased by 260 mg/L. The high-molecular-weight polymer intercepted was returned back to the water-washing and filtering unit after back-washing and precipitating, and enters into the product finally.

(2) The effluent from the filtering unit was subjected to coagulation and air flotation treatment, wherein the coagulant was poly aluminum chloride and the amount was 200 mg/L; the coagulant aid was polyacrylamide and the amount was 5 mg/L. The COD was decreased by 63 mg/L.

(3) The effluent from the coagulation and air flotation treatment was treated by anoxic-aerobic activated sludge method and the sludge age was controlled at 17 days. Aluminum ion as an adsorption promoter was added before the mixture of sludge and water from the aeration tank entering the secondary precipitation tank, and the amount thereof was 5 mg/L. Compared with the COD of the wastewater without adding adsorption promoter (340 mg/L), the COD of the effluent from the biological treatment (effluent from the secondary precipitation tank) was reduced by 120 mg/L, and the COD of the effluent was 220 mg/L and the ammonia nitrogen was 8 mg/L. If aluminum ion was not added before the mixture of sludge and water from the aeration tank entering the secondary precipitator but only added to the effluent from the secondary precipitation tank at a concentration of 5 mg/L for coagulation and precipitation treatment, the COD of the effluent was only decreased from 340 mg/L to 330 mg/L, the pollutant removal effect was not significant.

4) The effluent from the above biological treatment was subjected to advanced treatment. For coagulation and air flotation treatment, poly aluminum ferrous chloride was used as a coagulant and polyacrylamide was used as a coagulant aid. The amount of poly aluminum ferrous chloride was 2000 mg/L and the amount of polyacrylamide was 10 mg/L. The COD of effluent was 147 mg/L.

Example 4

FIG. 1 shows the traditional acrylic fiber production plants and the process thereof, by which the COD for the total drainage of the plant was 822 mg/L.

Using the method of the present invention, the traditional plants and the process thereof were modified as follows:

(1) By adding a hollow fiber filter with a pore size of 0.45 μm in the water-washing and filtering unit, the high-molecular-weight polymer was intercepted and recovered. 80 mg/L polymer was intercepted and recovered per ton wastewater, accordingly, the COD of the wastewater was decreased by 170 mg/L. The high-molecular-weight polymer intercepted was returned back to the water-washing and filtering unit after back-washing and precipitating, and enters into the product finally.

(2) The effluent from the filtering unit was subjected to coagulation and air flotation treatment, wherein the coagulant was PAC and the amount was 100 mg/L; the coagulant aid was polyacrylamide and the amount was 5 mg/L. The COD was decreased by 53 mg/L.

(3) The effluent from the coagulation and air flotation treatment was treated by SBR (sequencing batch reactor) and the sludge age was controlled at 17 days. Calcium ion and aluminum ion as adsorption promoters were added before the effluent from the SBR entering the precipitation stage, and the amount of the promoters was 100 mg/L (wherein the amount of calcium ion and aluminum ion was each 50 mg/L). Compared with the COD of the wastewater without adding the adsorption promoter (320 mg/L), the COD of the effluent from the biological treatment (effluent from secondary precipitation tank) was reduced by 110 mg/L, and the COD of the effluent was 210 mg/L and the ammonia nitrogen was 8 mg/L. If calcium ion and aluminum ion were not added before the mixture of sludge and water of the aeration tank entering the secondary precipitation tank but only added to the effluent from the secondary precipitation tank at a concentration of 50 mg/L for each calcium ion and aluminum ion for coagulation and precipitation treatment, the COD of the wastewater was only decreased from 340 mg/L to 330 mg/L, the pollutant removal effect was not significant.

4) The effluent from the above biological treatment was subjected to advanced treatment with $H_2O_2$ as an oxidizing agent and the amount thereof was 320 mg/L. Ferrous sulfate was used as a catalyst and a coagulant, the amount was 800 mg/L. PAM was used as a coagulant aid and the amount was 5 mg/L. The reaction was carried out in a static mixer. The separation was carried out with a sloping plate precipitation tank. The COD achieved 49 mg/L.

The above embodiments are presented only for describing the preferred embodiments of the present invention, which are not intended to limit the scope of the present invention. Without departing from the spirit of the present invention, those skilled in the art can make various modifications and improvements to the technical solutions of the present invention, which should fall within the protection scope defined by the claims of the present invention.

We claim:

1. A method of treating wastewater and recovering resources in acrylic fiber production, comprising the following steps:
    A) filtering wastewater from water-washing and filtering unit of acrylic fiber plants by a filter to intercept and recover high-molecular-weight polymer contained therein, and then returning the recovered polymer back to the acrylic fiber production and adding the recovered polymer into the finished product, optionally, reusing part of filtered wastewater in the water-washing and filtering unit;
    B) removing non-interceptable high-molecular-weight polymer in the wastewater by subjecting the wastewater from step A) to coagulation and air floatation treatment;
    C) introducing the effluent from step B) into biological treatment unit and adding polyvalent metal ions as an adsorption promoter to increase the removal of non-biodegradable organics in the biological treatment unit, where the polyvalent metal ions are selected from the group consisting of calcium ions, magnesium ions, aluminum ions and a mixture thereof, and the amount added is 5 to 100 mg/L; and
    D) removing the organics remaining in the effluent from the biological treatment unit after step C) by an advanced treatment, wherein the advanced treatment is selected from the group consisting of any combinations of oxidation, coagulation, precipitation and air floatation.

2. The method according to claim 1, wherein the filter used in the step A) is a surface filter with membrane material or a depth filter using a fiber tow or fiber cotton as a filter medium; when using a depth filter, the filtration rate through the fiber tow or fiber cotton in the filter is 10 to 30 $m^3/(m^2 \cdot h)$ and the height of the filter layer is 1 to 2 m.

3. The method according to claim 2, wherein in the step (A), the wastewater is precipitated in a precipitator before being filtered, and the time for precipitation is 2 to 5 hours.

4. The method according to claim 3, wherein the intercepted high-molecular-weight polymer is dispersed in backwash water by backwashing, which then is returned back to the precipitator, and the polymer at the bottom of the precipitator is returned back to the acrylic fiber production and added to the finished product.

5. The method according to claim 1, wherein in step (B), the non-interceptable high-molecular-weight polymers in the wastewater are removed by using coagulation and air flotation treatments, in which the pH of the wastewater is adjusted to 6 to 9 before coagulation treatment, and the wastewater is added with coagulants and coagulant aids during the coagulation treatment and then introduced into the air flotation unit after reaction.

6. The method according to claim 5, wherein the coagulant is poly aluminum chloride or poly aluminum ferrous chloride, and the amount added is 50 to 200 mg/L; the coagulant aid is polyacrylamide, and the amount added is 2 to 10 mg; a reflux ratio of air-saturated water is 30% to 60%; and COD removal rate is 10% to 20%.

7. The method according to claim 1, wherein in step C), the effluent from the coagulation and air floatation units is added with the polyvalent metal ions as the adsorption promoter, then well mixed with return sludge; or the polyvalent metal ions are added directly at a position where return sludge and influent are mixed; or added when a mixed liquid of sludge and water of an aeration tank entering a secondary precipitator; wherein the biological treatment unit uses an activated sludge process or an activated sludge process with addition of biological carriers, the age of the activated sludge is 15 to 30 days.

8. The method according to claim 7, wherein in the step D), the non-biodegradable organics are removed by adding successively an oxidizing agent, a coagulant or a compound agent for oxidation and coagulation, and a coagulant aid to the effluent from the biological treatment unit to exert the combined effects of oxidation, coagulation, precipitation or air flotation.

9. The method according to claim 8, wherein the oxidizing agent is a water-soluble oxidizing agent, and the amount is 50 to 400 mg/L; the coagulant is selected from the group consisting of polyvalent metal salts and polyvalent polymers, and the amount is 200 to 2000 mg/L; the coagulant aid is selected from the group consisting of diatomaceous earth and polyacrylamide, and the amount is 2 to 15 mg/L; the pH for reaction is 6 to 8; and a COD of the effluent is reduced to below 150 mg/L.

10. The method according to claim 9, wherein the water-soluble oxidizing agent is hydrogen peroxide or chloric acid.

* * * * *